Aug. 18, 1925. 1,549,903
H. BUEL
PROCESS AND MACHINE FOR MAKING CONTAINERS AND OTHER ARTICLES
OUT OF PULPS AND OTHER COMMINUTED SUBSTANCES
Original Filed Aug. 15, 1916  4 Sheets-Sheet 2

Inventor
HILLHOUSE BUEL
By his Attorneys
Sheffield Betts

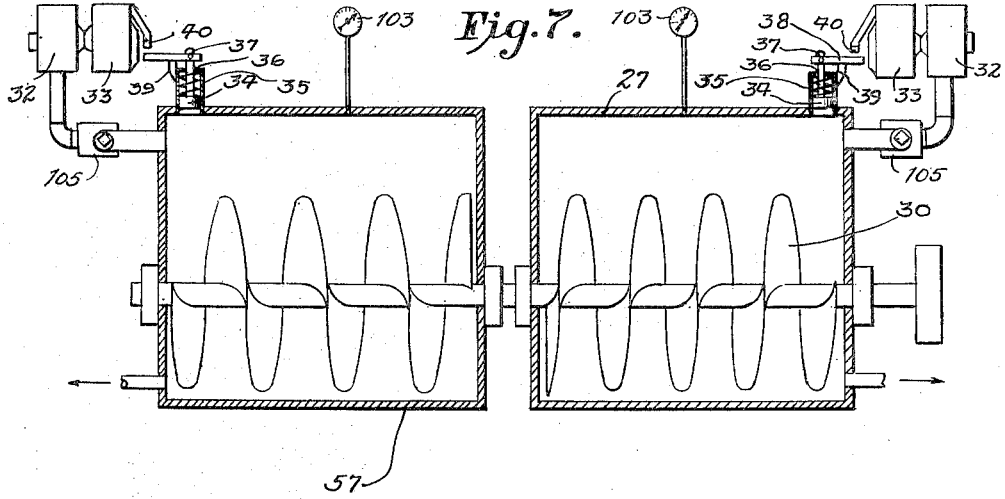
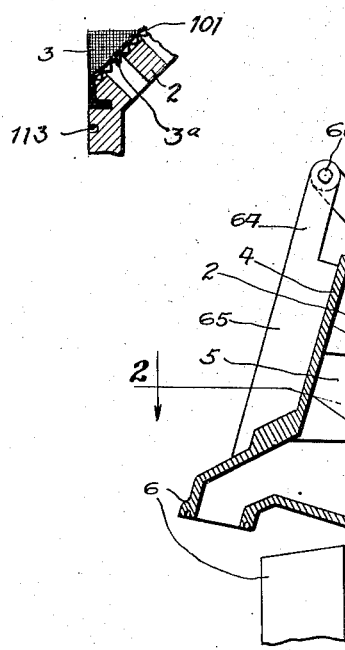
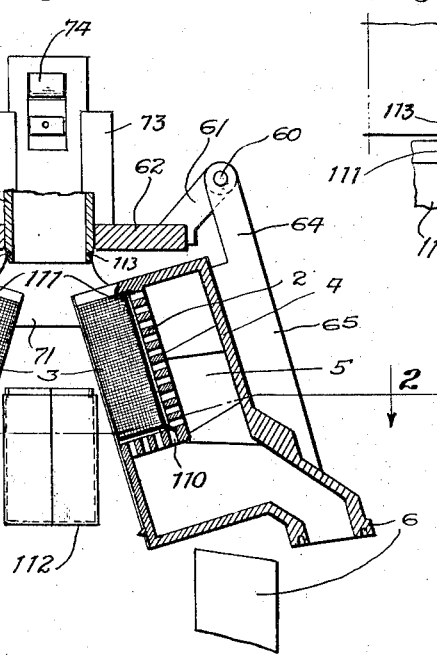
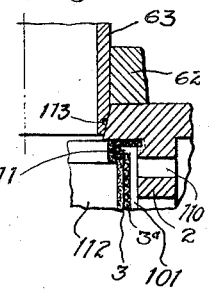

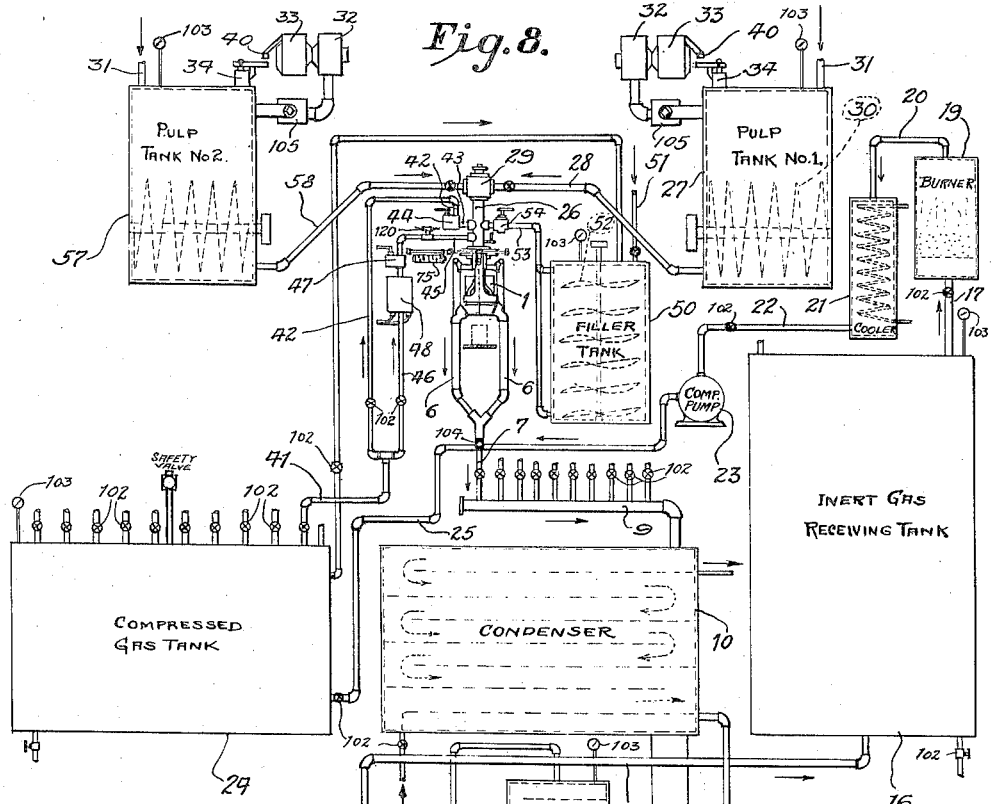
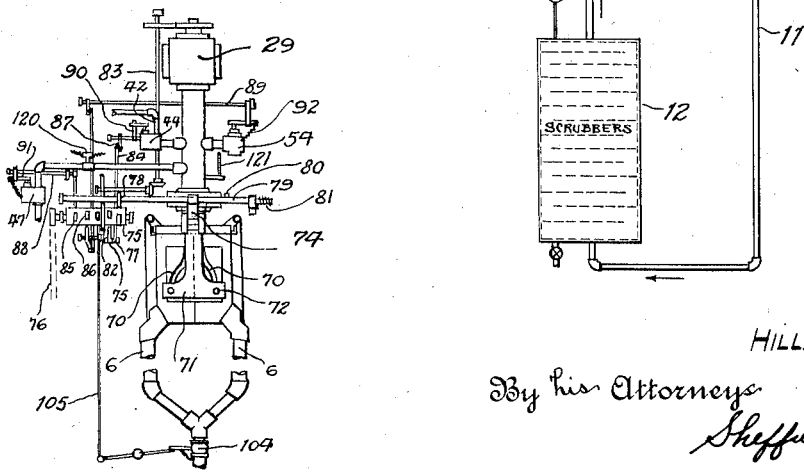

Patented Aug. 18, 1925.

1,549,903

UNITED STATES PATENT OFFICE.

HILLHOUSE BUEL, OF SEATTLE, WASHINGTON, ASSIGNOR OF ONE-HALF TO WILLIAM P. HAMMOND, OF SCARSDALE, NEW YORK.

PROCESS AND MACHINE FOR MAKING CONTAINERS AND OTHER ARTICLES OUT OF PULPS AND OTHER COMMINUTED SUBSTANCES.

Continuation of application Serial No. 115,086, filed August 15, 1916. This application filed April 18, 1921. Serial No. 462,438.

*To all whom it may concern:*

Be it known that I, HILLHOUSE BUEL, a citizen of the United States, and a resident of the city of Seattle, county of King, State of Washington, have invented a new and useful Process and Machine for Making Containers and Other Articles out of Pulps and Other Comminuted Substances, of which the following are specifications.

The principal object of my invention is to provide a practical process for forming articles from comminuted materials by flowing such materials against a foraminous mold wall in a manner that will meet commercial and shop requirements.

Other objects of my invention will hereinafter more fully appear.

It has heretofore been proposed to manufacture articles from a pulpy mass by flowing the pulp against a foraminous mold wall, but a great many difficulties have been encountered, both technical and commercial.

For example, it has been the uniform experience of all persons heretofore attempting to produce articles to meet commercial requirements, that the moisture of the liquid pulp has not been removed effectively or economically enough to meet existing commercial requirements. The cost has been competitively prohibitive. The walls of the articles were not smooth or uniform. The corners and edges were not sharp or well formed and presented much loose material. The walls were not compactly formed and presented too large a percentage of voids. If heated air or superheated steam was used to dry out the water, the time, power and material consumption would be prohibitive.

I have discovered, by using a very thin pulp, which has been properly screened, that I can secure an unusual accuracy as to the thickness of wall and smoothness of surface of wall of article; that this is accomplished at the expense of an increased length of time required for depositing the pulp on the mold wall, but the increase in time is not prohibitive, especially in articles requiring great exactness or evenness in these properties. I have found from a long range of experiments that pulp carrying from three-tenths of one per cent to one per cent gives very satisfactory results in controlling this operation. For instance, the use of thin pulp enables me to secure a wall of uniform thickness throughout, no matter what position the mouth of the mold may be in. Moreover, the time required for depositing pulp on the mold wall does not vary exactly in inverse proportion to the thickness of the pulp, but at a somewhat different ratio. For example, in laying down a wall of given thickness, a pulp three-tenths of one per cent of solids would not require for deposition exactly three times the time required for the deposition where using a pulp nine-tenths of one per cent of solids, but the times would vary more nearly in the relation of thirteen and one-half to five. This technical discovery I find is most useful in making many articles.

My invention comprises the use of super-atmospheric pressure applied within and the use of a vacuum applied on the outside of the foraminous walled mold, which is constructed with a vacuum tight discharge chamber. This application of the vacuum facilitates the escape of moisture where heavy pressure is applied from within, affords an effective control over the drying where air or steam may be used, causes a uniform drying throughout the body of the pulp walls, prevents case-hardening, burning or other injury to the comminuted materials forming the walls of the article. These valuable and novel results from the use of vacuum during the drying step flow in part from the fact that the vacuum causes the moisture in the outer part of the deposited material to evaporate at a relatively low temperature, thereby utilizing a quantity of latent heat from the escaping gas and which is entirely lost in drying operations when a vacuum is not so employed, and by keeping the outer layers cool by low pressure evaporation and preventing excessive rise of temperature on the part of the inner layer by conduction through the deposition. This action is greater than might seem probable at first sight owing to the fact that, with a considerable degree of vacuum, say that measured by twenty-five inches of mercury or over, the pressure is maintained below atmosphere a material distance within the deposited material even when using a pressure of 1000 pounds gage within the mold. Applicant also wishes to call attention the familiar laboratory experiment of boiling water in a paper container, and to his own more recent experiments in frying eggs and meats on pulp and fibre board pans and containers over a hydrogen gas flame of the usual intensity for cooking, which showed that the heat transference was so rapid through the fibre board as to prevent burning or carbonizing where the flame played directly upon the bottom side of the fibre board pan.

Furthermore, the vacuum so used makes it possible to work with any drying gases at a much higher temperature without damaging the material being dried. When, in addition to this, intensely heated gas is under sufficient pressure to be forced rapidly through the pores of the material, very novel and useful phenomena are produced which, with the aid of the vacuum, result in a uniform release of latent heat units throughout the body of the material and the consequent uniform rapid heat transference and vaporization throughout the body of the material without overheating any portion thereof.

Also, the deposition dries at a uniform rate throughout its thickness when using a vacuum on the discharge side of the deposition. If atmospheric pressure prevails on the discharge side of the deposition, moisture driven from the hot side will recondense in the layers on the cold side, or there will be sufficient tendency toward recondensation to at least prevent evaporation of moisture in the cooler layers. The drying is therefore not so rapid or uniform as when vacuum is used on the discharge side, being carried out only progressively instead of simultaneously as when vacuum is being used. Experience shows that there is a lower rate of flow of heat units to the moisture within the deposition in the progressive as compared to the simultaneous drying. It is evident too that the inner layers have greater opportunity to become overheated and damaged while in contact with the heated drying fluid after these layers have become dry. Such damage occurs not only by charring, but also by case hardening, a phenomenon occurring at materially lower temperatures than charring, and causing brittleness, loss of strength, discolorization, and trouble in impregnating. Case hardening of many pulp depositions occurs readily upon exposure to 250 degrees F. for a brief period of a few seconds or less.

I have also demonstrated that by reason of this combination and use of high temperatures and pressures in the drying gas and the vacuum on the discharge side of mold these phenomena which occur actually protect and prevent injury to the materials while greatly speeding the drying, and makes possible the use of very high temperatures for drying in mold. These temperatures may range from 275° F. to over 2500° F., effective results being had at 500° F. to 1000° F. However, according to my process, a highly heated inert gas, as nitrogen, may be used for the drying where liquid pulps are employed, thus making possible the use of extremely high drying temperatures, heretofore unknown to the art. Such high temperatures, if used in any of the processes prior to my invention, would rapidly carbonize the vegetable and animal materials used.

My process, moreover, employs an unusually high pressure, in excess of 80 pounds gauge within the mold, both for the deposition of the liquid pulp and the drying, thus greatly accelerating the deposition and drying and greatly augmenting the mechanical expulsion of the moisture from the deposited pulps, and decreasing the thermal units and time required for drying.

My present invention includes forming the mold in such manner that an article made therein has an exterior shoulder adjacent the mouth whereby it is adapted to receive a tight-fitting, rigid and most effective protective cap of one of a variety of shapes, and the container is suitable for automatic capping.

My novel apparatus for carrying out my process employs a compensating reservoir operating with a cushion of compressed gas in such a manner as to automatically maintain a relatively constant pressure and supply of pulp, which feeds the liquid pulps to the molds and simultaneously deposits the pulp material on the walls of the mold.

It also comprises an arrangement of two or more compensating pulp reservoirs which makes possible the building of the walls of the container or other article of two or more different kinds of pulp or comminuted substances, laid down in separate but interfelted layers, far more efficient than the laminated sheets now known to the paper board business, as in my process the strata or laminations are inter-woven and interlocked and cannot possibly separate under even wet conditions.

It further employs such a control over compressions and vacuums in molding articles as to provide a most effective felting system in the use of liquid suspension for delivery and molding the comminuted substance. This also affords a practical and effective means for making articles having therein laminations of leather and other animal or mineral fibre in conjunction with selected vegetable fibre and thus makes possible veneered products such as leather veneer in which the veneer is inter-locked with some other long and strong fibre, affording a product of great commercial value, and producing such products as imitation leather with great flexor-tensile strength.

In obtaining the results stated, I use gauge pressures ranging from eighty pounds to above a thousand pounds for depositing and drying the comminuted materials for most articles, preferably from 90 to 125 pounds gauge, although I do not limit my process to these pressures. I may apply filling and coating treatments either within or after removal from mold. Some treatments, however, can be made under comparatively low or nominal pressure.

As to certain aspects, the present application is a continuation of my co-pending process application, Serial No. 195,726, filed October 10, 1917, which is a continuation of Serial Number 115,086, filed August 15, 1916, but in other respects is an improvement over the invention disclosed in said application, as well as that in my co-pending machine application, Serial No. 180,979, July 17, 1917.

The novel features of my invention are pointed out with particularity in the appended claims. The invention itself, however, with further objects and advantages, will best be understood from the following description taken in connection with the accompanying drawings in which—

Fig. 4 is a central vertical section of the mold shown in Fig. 2.

Fig. 5 is a detail section view, on a large scale, of a portion of the mold shown in Fig. 2, the portion illustrated being adjacent the line of division of the mold and adjacent to one corner of the mold chamber.

Fig. 6 is a detail section of the inlet to the mold and a portion adjacent to the inlet illustrating my arrangement of the mold wall at the top for forming a shoulder on the container to receive a cover.

Figs. 5 and 6 also illustrate in detail the construction of the mold wall.

Fig. 7 is a section view of a pair of pulp reservoirs according to my invention.

Fig. 8 is a diagrammatic view of a complete apparatus for carrying out my process, parts of the control mechanism being omitted for purposes of clearer illustration.

Fig. 9 is an enlarged detail view of the mold and control mechanism of Fig. 8.

Figure 2:
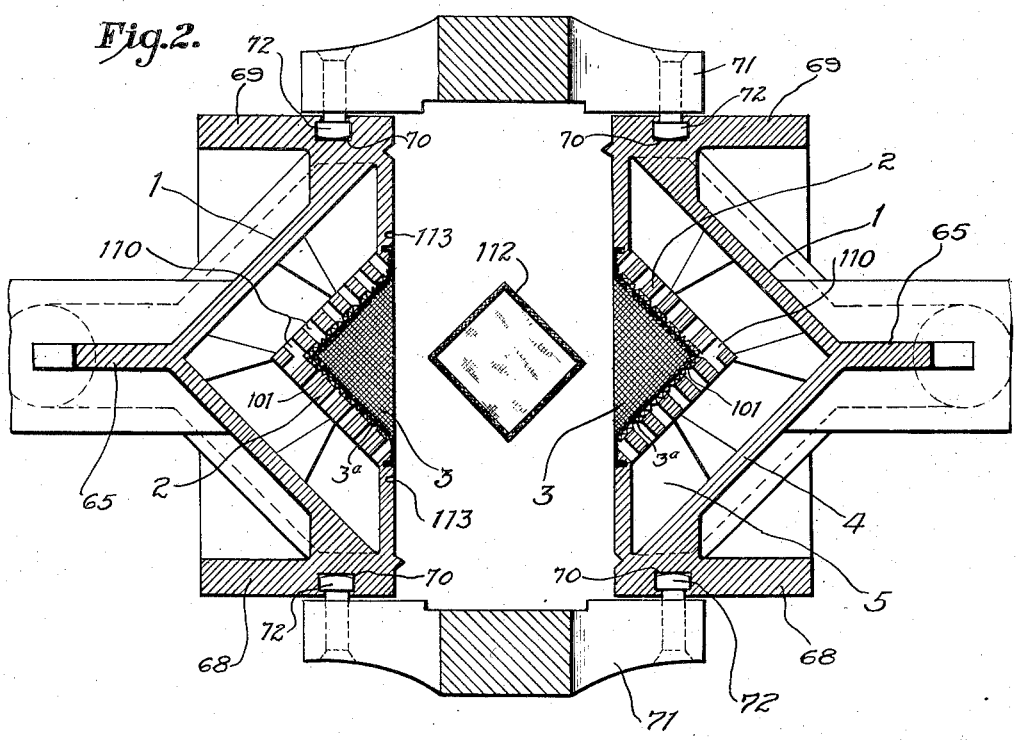
Fig. 2 is a section detail view of a mold according to my invention, taken on line 2—2 of Fig. 4, the mold being shown open in the act of dropping out a container.
Figure 3:
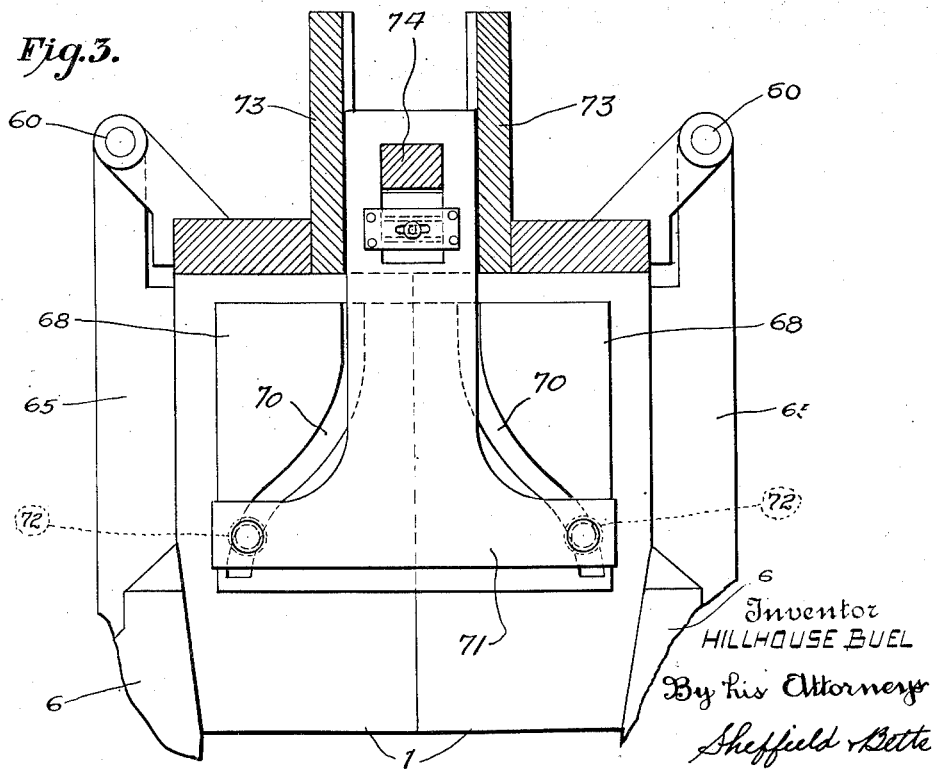
Fig. 3 is an elevation view of the mold shown in Fig. 2, the mold being closed and parts being shown in section.

Referring to the drawings, 1 indicates a hollow mold having an internal mold chamber of square cross-section, the mold being divided on a diagonal of the mold chamber, as appears in Fig. 2. The mold has an aperture wall 2 to permit the escape of liquids and gases therethrough, the inner face of the wall 2 being covered by a screen 3 of wire mesh or other suitable material adapted to retain thereon pulp material introduced into the mold chamber. Between the wall 2 and the outer wall 4 of each of the two parts of the mold 1 is a chamber 5 which connects with one of the branches 6 of the pipe 7. When the mold is closed, the chambers 5 are kept under vacuum or reduced pressure by means of a vacuum pump 8, the path from the pipe 7 to pump 8 leading through a header 9, a condenser 10, a pipe 11, scrubbers 12 and 13, and pipe 14. On its outer side the pump 8 is connected to pipe 15 which conducts material discharged by this pump into a receiving tank 16. Gas from tank 16 may pass through pipe 17 into a burner 19 where any oxygen in the gas is consumed, gas passing from burner 19 through pipe 20 and cooler 21 and pipe 22 to the compression pump 23 which delivers gas under pressure to tank 24 through pipe 25, gas from tank 24 being used in the mold for expelling liquid from the mold, compacting, and drying the deposited material. The burner 19 is preferably merely a grate or metal basket containing hot charcoal and enclosed within a casing. I find that hot charcoal is very efficient in combining with and thus eliminating free oxygen which may find its way from time to time into the gas circuit including burner 19. It is sufficient if the charcoal be heated initially, subsequent oxidation of the charcoal serving to keep it hot.

Pulp is introduced into the mold at the top through pipe 26. Pulp is introduced into the mold under super-atmospheric pressure sufficient to deposit and compact the wall of the article at one step, the deposition being formed against the inner face of the lining 3. I prefer to inject a liquid pulp into the mold direct from a closed tank, such as 27, in which the liquid pulp is maintained under an automatic compensating constant continuous gas pressure. Connection from tank 27 to pipe 26 is made through pipe 28 and the control valve 29 of suitable design. The beater or stirrer 30 is provided in the tank 27 to prevent the pulp and liquid from separating in the tank. Pulp is introduced into tank 27 through pipe 31 from a standard material control box and stuff vat not shown, and the pulp in the tank is maintained under a suitable constant continuous gas pressure by means of a pulp and material pump 32 driven by electric motor 33. A piston 34 is provided at the top of tank 27, the piston being guided in a chamber 35 and the end face of the piston being exposed to the pressure of the gas above the pulp in the tank 27. The gas pressure tends to force the piston 34 upwardly into the chamber 35 against spring 36. Piston 34 has a rod 37 fixed thereto which is pivoted to one end of a contact member or lever 38. When the gas pressure in tank 27 falls below the desired degree, spring 36 forces the piston downwardly bringing lever 38 against the fixed stop member 39 and thereby forcing the outer end of lever 38 upwardly and closing the circuit of the motor 33 at the point 40. When enough pulp has been forced into the tank 27 to bring the pressure of the gas above the liquid back to normal, the circuit of the motor 33 is automatically interrupted.

Figure 1:
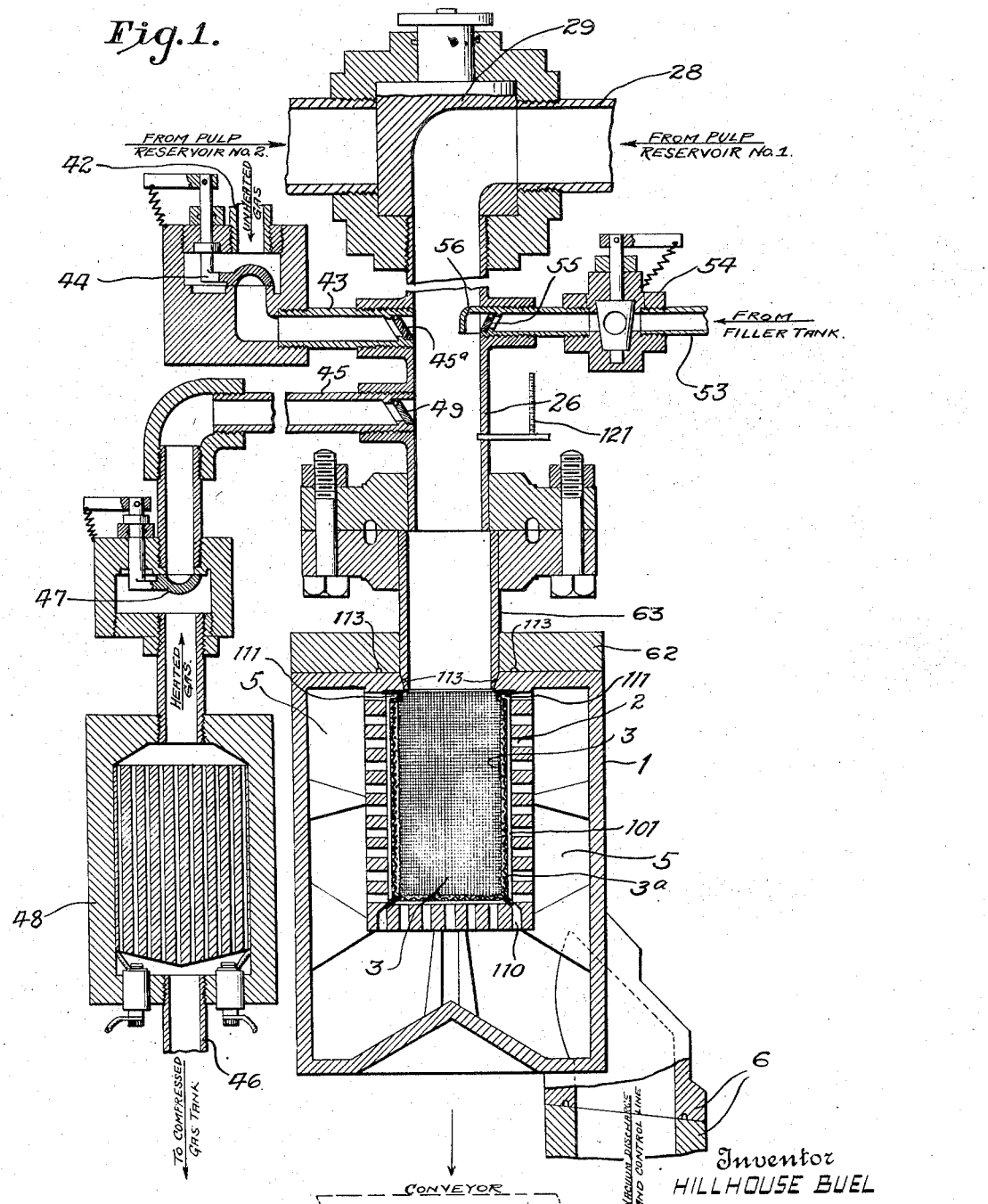
Fig. 1 is a section view, somewhat diagrammatic in character, of a portion of an apparatus according to my invention and for carrying out my process, illustrating the interior of a mold as well as other features of my apparatus.

The valve 29 being in the right position, pulp from the tank 27 enters the mold through pipe 26 under super-atmospheric pressure, preferably for most articles above seventy-five and under one hundred and twenty-five pounds per square inch gauge pressure. Some articles, however, may require as much as one thousand pounds pressure or more. When the proper amount of pulp has been deposited in the mold, valve 29 cuts off communication with the tank 27 and gas from tank 24 is admitted to the mold through pipes 41, 42 and 43, the admission of gas from pipe 42 to the mold being controlled by valve 44 intermediate pipes 42 and 43. As clearly appears in Figs. 1 and 9, pipe 43 enters the vertical inlet pipe 26 below the valve 29 and a check valve 45ᵃ is provided to prevent pulp from flowing into pipe 43. The gas admitted through valve 44 and pipe 43 is unheated and serves to expel from the mold the liquid trapped in the mold and pipe 26 when valve 29 cuts off communication with the pulp supply. The gas may also be under sufficient pressure to further compact the deposited material. The supply of gas from pipe 42 may be turned on and cut off several times at short intervals to produce pulsations of pressure in the mold, thus permitting the deposited material to alternately expand and contract and producing a thorough felting and interlocking of the fibres. After the liquid has been expelled from the mold and after the felting action, if used, has been completed, heated gas under pressure is introduced into the mold through pipe 45, the heated gas also connecting from tank 42 through pipes 41, 46 and 45, pipe 45 connecting with an inlet pipe 26 immediately below pipe 43. The admission of heated gas to the mold is controlled by valve 47, the gas being heated in its passage from tank 27 to pipe 26 by means of the heater 48 which is preferably of the electric and electric grid type.

I may use very high temperatures in the drying step of my process, and for this reason the heated gas preferably should be of an inert character. I may use nitrogen, neon, carbon dioxide or the like for this purpose, or a mixture of these gases, but do not limit myself thereto. It will be seen that the burner 19, previously mentioned, serves to consume and exhaust the oxygen in the gas passing through it, when nitrogen is used, so that the gas furnished by the heater 48 to the mold for drying purposes is principally nitrogen, but possibly containing some carbon dioxide. When using certain materials, I am able to use a drying gas of a temperature of 1000° Fahrenheit and higher. When using ordinary wood pulp, I prefer to work at a temperature ranging from 500° to 1000° Fahrenheit, the pressure in the mold being maintained sufficiently high to give desired compactness with speed of drying. Below 275° Fahrenheit, the drying action becomes unadvisably slow due to slow heat transference which naturally results from slight differences between latent heats and vaporizing points occurring in the adjacent stratas of the wall of the article due to the small differences maintained in the temperatures and pressures on the inside as against the temperatures and pressures on the outside of the wall. When these conditions obtain, normal results will not be secured.

I find that the maintenance of partial vacuum on the outlet side of the mold is advisable when air is used as a drying gas and is essential to the best use of high temperatures with any drying gas used in drying most pulp materials. The vacuum pump, previously mentioned, should have sufficient capacity to maintain as high a vacuum as is consistent with the process, for the reason that the efficiency of the vacuum control is measured and directly affected by the degree of vacuum maintained in the chamber 5 at the time that the drying gas is being supplied to the mold. This is especially essential where air is used as the drying gas, provided that the temperature of the drying gas exceeds 302° Fahrenheit and the deposition consists primarily of cellulose or other organic materials. In this connection, a condenser 10 is important in assisting to maintain the vacuum in the mold by removing the moisture from the exhausted gases prior to their passage through the pump 8, and in acting as a vacuum reservoir. Liquids or condensed vapors are collected in the settling chamber 57 of the condenser 10 from which they may be discharged. A check valve 49 prevents material from flowing into pipe 45.

The gas from the heater 48 serves to dry the deposited material and after it has been dried I may introduce a filling material to impart body and stability to the article, render it liquid proof and for other purposes. Instead of filling I may use coating or other treating materials, or both may be used. I have disclosed specifically the means for supplying filler.

Filling material is contained in the tank 50 which contains fluid filler under pressure supplied through pipe 51. The tank 50 is preferably provided with an agitator 52. Connection between the tank 50 and pipe 26 is made by pipe 53, and the admission of filling material to pipe 26 and the mold is controlled by valve 54. A check valve 55 prevents the admission of pulp material into the portion of pipe 53 adjacent to the pipe 26 and a hood 56 serves to direct the filling material downwardly toward the mold as the filling material leaves pipe 53, thus preventing waste of such material. The filling and treating materials may be dissolved in a solvent liquid. This is preferably of volatile character, and by the application of heat and vacuum such solvent is driven out of the article leaving the filling material therein. The solvent may be recovered in the scrubbers 12, 13, previously mentioned, or in suitable solvent recovery apparatus.

If desired, I may utilize more than one form or kind of material in the wall of a given article. In this case, I provide an additional pulp tank, such as 57, the mechanical details of which are preferably similar to the tank 27 already described, tank 57 being also connected to the valve 29 by a pipe, such as 58. When two pulp tanks are used, the movement of the valve 29 is suitably controlled to admit pulp first from one tank, then the other, so that the wall of the article is built up of successive layers of the different materials interlocked and interfelted. The individual layers thus produced, when required, may afterward be more thoroughly interlocked by alternate changes of pressure in the mold in the manner previously described in connection with the felting step of my process. In this way, a long fibre material may be used with a short fibre and less expensive one to give additional strength to the wall of the completed article. It will be observed that in the diagrammatic view, Fig. 9, the pulp tanks are shown separated. Where possible, I prefer to place them adjacent to the molds and to each other, when two or more are used, as indicated in Fig. 8.

Referring again to the construction of the mold, this comprises two parts swung from pivots 60, 60 at the ends of brackets 61, 61 which extend upwardly and outwardly from the edges of a plate 62, there being a pipe 63 passing through the plate 62 which serves to introduce the material into the mold, pipe 63 serving as an extension of the pipe 26, previously mentioned. The two parts of the mold are swung below the plate 62 by arms 64, 64 which form extensions of ribs 65, 65 projecting outwardly at opposite corners of the outer wall 4 of the square mold 1. Ribs 65 lie in the plane at right angles to the line of division between the two parts of the mold, and the mold has two pairs of flanges 68, 68 and 69, 69 connected to the parts of the mold near their line of division and extending parallel to the plane of the ribs 65, forming faces in which are curved cam grooves, such as 70, through which the opening and closing action of the mold is controlled. Working parallel to each of the faces formed by the flanges 68 and 69 is an inverted T-shaped yoke, such as 71, having pins, such as 72, fixed near the outer ends of the heads of the T and working in the grooves 70. Owing to the shape of the grooves 70, the mold will be open when the yokes 71 are raised and the mold will be forcibly closed when the yokes are forced downwardly. The yokes are arranged to work up and down in guides, such as 73, their movement being controlled by levers or fingers 74.

Referring more particularly to Fig. 5, the inner foraminous surface of the mold is composed of a metal fabric in one or more layers. The inner layer, just mentioned, is supported by another metal fabric 3ª, the individual elements of which are sufficiently large and strong to support the pressure caused by the pulp or gas within the mold forcing the deposition against the inner layer 3, thus spacing the inner face of the layer 3 from the solid portions of the apertured wall 2, and providing passages whereby liquid passing through the inner layer of the mold opposite a solid portion of the wall 2 may readily pass along the inner face of such solid portion to an opening leading into the vacuum chamber 5. In order to further facilitate the flow along the inner face of wall 2, I may serrate this face as indicated at 101. The openings in the wall 2 are preferably of hexagon section, as I find it otherwise difficult to obtain the desired percentage of openings in this wall, without unduly weakening the walls.

I find, moreover, that it is important to maintain a high percentage of drainage area in the inner layer of the mold, as well as in the layer 3ª and in the wall 2, my experience showing that preferably fifty per cent or more of the areas of these members should be cut away to form apertures or vents.

The opposed faces of the mold sections along the line of division of the wall have air pockets or recesses 113 therein to retard leakage of gas and pulp from the interior of the mold.

My experiments have shown that it is very important when depositing a rectangular article that the supporting wall 2 have apertures 110 opening exactly at the corners of the mold chamber in order to insure a thoroughly solid deposition at the corners and to give the interior angles a sharp outline.

While in order that the containers made by my process and apparatus may be well adapted to receive a pulp cap and also be adapted to machine capping, I make the mold with an inwardly projecting shoulder portion 111, surrounding the pulp inlet and having a depth suitable for the length of the cap for the container, the container 112 being formed with a complemental shoulder.

I may install molds, according to my invention, in batteries, or I may mount them in such battery units as may be desired upon either rigid or revolving tables.

Suitable hand valves 102 are provided where thought desirable, for example, between the gas tank 24 or exhaust header 9, and the piping of any mold unit. Gauges 103 are provided at suitable points. In the suction line between the mold and condenser, I provide an automatic cut-off valve 104 which interrupts communication with the condenser on the mold side when it is desirable to open the mold.

The operations of opening and closing the mold as well as the operations of the other parts, previously described, are controlled from a cam member 75, as in Fig. 9, which is revolved or otherwise suitably operated in accordance with the specific mechanical design adopted and the desired cycle of operations to move the various parts in the proper sequence. Preferably member 75 is revolved by means of a belt 76. As illustrated, member 75 carries a segmental gear 77 which meshes with a complemental gear member 78 on the shaft 79 to turn the shaft in the direction to lift one of the yokes 71 by means of one of the fingers 74, previously mentioned. A gear member 80 fixed to shaft 79 meshes with a complemental gear member (not shown) on a shaft (not shown) similar to and parallel to the shaft 79 for operating the other one of the yokes 71 in the manner just described. The spring 81 serves to reverse the motion of shaft 79 and its companion shaft (not shown) to lower the yokes 71 and forcibly close the mold. The valve 29 preferably has a continuous motion of rotation and is driven from member 75 by means of gear 82 and a suitable train of gearing and shafting indicated by numeral 83. The operation of valves 44, 47 and 54 is also controlled from the member 75 by means of cam-like pieces or tappet projections 84, 85 and 86, respectively, other suitable trains of mechanism indicated by reference numbers 87, 88 and 89. As illustrated, the mechanism 87, 88 and 89 serve in each instance merely to open the corresponding valves, the valves being closed by suitable springs 90, 91 and 92. Valve 104 in the suction line is operated from cam drum 75 by linkage 105.

I have found that the use of thin pulps enables me to obtain deposition on the foraminous mold wall of great evenness and density without increasing the time required for each deposition beyond commercial limits, when using the large pressures. When the pulp contains as high as two and one-half per cent of solids, the deposition is as rapid as necessary for practically all classes of containers now on the market, provided the pressure is properly maintained during the time the pulp is flowing onto the mold. When using pulp containing three-tenths of one per cent of solids, a pressure of eighty to ninety pounds gauge, and a vacuum of twenty inches of mercury, I have made depositions one-thirty-second of an inch thick in approximately three seconds. On account of the great uniformity and smoothness of deposition, thus obtained, I prefer to use pulps of between three-tenths of one per cent and one per cent of solid matter, and not to exceed two and one-half per cent of solids in making the majority of articles wholly of pulp.

A point of great practical importance is that the pulp trapped in the mold by valve 29 should be deposited by unheated gas, when high temperatures are used in drying. Otherwise, the upper part of the deposition would be drier than the lower and would tend to carbonize or damage before the lower part is fully dry, when using highly heated gas in the succeeding drying step of my process. By using unheated gas for completing the deposition, the deposited material is all of the same initial and final moisture content.

In applying treating and filling materials to articles according to my process, it is often convenient to use such materials in dissolved form, and, in such case, the solvents used are driven out of the deposition by the admission of heated gas under pressure subsequent to the drying and filling steps, the solvent not recovered in the condenser 10 being scrubbed out of the gas while still on the vacuum or low pressure side of the pump 8 by passing the gas and contained solvent through one or more scrubbers 12, 13, or standard solvent recovery apparatus.

The application of gas of the proper temperature for drying the deposition and expelling solvent therefrom is facilitated by the provision of suitable instruments at the points 120 and 121, a pyrometer and thermometer, respectively, being illustrated at these points.

In order that the article may not be damaged after the drying step by the high temperatures used, in this, I may introduce a non-oxidizing cooling gas before opening the mold.

When giving a treatment after drying, if the substances used in this would be injured or the treatment interrupted by the high temperature gas, such cooling gas is introduced prior to such treatment. The article also may be cooled, where required, after completion of all treatments. The cooling gas is introduced by opening valve 44 at an appropriate point in the cycle of operations.

In order that those interested may readily practice the steps of depositing and drying material according to my process, I will now set out in detail a somewhat typical specific experiment performed by me:

When using liquid wood pulp containing three-tenths of one per cent of solids, delivered to the mold under an initial air pressure on air tanks of 90 pounds, and pressure at end of operation of 89 pounds gauge, I obtained a deposition .032 inch in thickness in approximately three and one-fourth seconds. The mold having been freed from liquid and the drying gas introduced therein, I then removed all traces of moisture from the said deposition, using heated air from said tank as the drying medium, the drying air being introduced at an initial temperature of approximately 575 degrees, and having a final temperature of 600 degrees Fahrenheit. The outlet side of the mold was connected throughout the depositing and drying steps to a vacuum pump, the gauge on the exhaust line showing 29.2 inches of mercury at the start of step at deposition, but falling to 27.3 by the end of the drying step, this corresponding to 25 inches of mercury at the mold. The deposition was completely dried in approximately 1¾ seconds and showed no evidence of casehardening or other injury, deposition and drying together occupying five seconds. As air was being used, the temperatures could not be as high as if an inert gas had been employed as the drying agent. Moreover, the time stated above was for making the article completely bone dry. In many cases, it is necessary only to make the article air dry.

While I have illustrated and described my method as including the filling and treating of the article on or in the mold used in connection with its formation, I do not limit myself to this. A given mold can evidently turn out more articles if they are filled, sized and treated in a separate apparatus. A separate treating means, such as just mentioned, can be combined, where desired, with means for filling, sizing, treating, liquid-proofing and calendering the article or container.

It is evident, also, that by my process, I can make pulp containers which are sufficiently uniform, compact, rigid and strong and equipped for a substantial pulp cap made by some process suitable for machine capping, to warrant their being made rectangular and thereby saving the space in packing and shipping now wasted by the large use of round paper-board containers.

While I have described and illustrated the preferred process according to my invention, and the preferred means for carrying said process into operation, I do not wish to be limited to the details of procedure, form, material, construction or arrangement herein disclosed, except in so far as such details are essential to the novelty of the appended claims.

Having thus described my invention, I claim:

1. The process of making articles from comminuted material, the first step of which consists in forcing a fluid mass against a foraminous mold wall to deposit thereon the comminuted material in said mass to form the wall of the article, and the second step of which consists in subjecting the exterior of said wall to a partial vacuum simultaneously with the application of a high temperature to the inner surface of said wall to dry the deposition.

2. In the process of making articles from liquid pulp on a foraminous mold, the step of drying the deposited material by passing a heated drying fluid therethrough while maintaining a partial vacuum on the discharge side of the foraminous mold wall.

3. The method or process of making pulp containers comprising depositing the wall of the articles from a pulp bearing liquid, and thereafter applying a heated inert gas under superatmospheric pressure.

4. The method of making pulp containers comprising depositing the wall of the article from a pulp bearing liquid, and thereafter applying a heated inert gas under superatmospheric pressure at a temperature sufficient to cause charring under atmospheric conditions.

5. The method of making containers comprising building up the wall of the container by depositing successive layers of materials having different characteristics and interlocking said layers by felting and by alternately diminishing and increasing the pressure on the deposited material.

6. In the process of making articles from cellulose containing pulps, the step of drying the article by passing through it a drying gas at an inlet temperature above that at which cellulose chars under atmospheric conditions while maintaining a partial vacuum on the discharge side of the article and an inlet pressure above atmospheric, the pressures on the inlet and outlet sides of the article being so related as to prevent injury to the cellulose therein.

7. In the process of making articles from cellulose containing pulps, the step of drying the article by passing through its wall a drying gas having a pressure on one side of the article of at least seventy-five pounds gauge and a temperature of over 275° Fahrenheit adjacent the wall of the article, a partial vacuum being maintained on the other side of the wall, the degree of vacuum being higher with increase of temperature on the pressure side of the article.

8. The process of forming products from comminuted materials, the first step of which consists in forcing a liquid mass under superatmospheric pressure against all parts of the foraminous mold wall at one time to simultaneously deliver and compactly deposit the comminuted materials in said mass to form the article; the second step of which consists in introducing a gas under superatmospheric pressure to deposit all the comminuted materials remaining suspended in the conduit and mold after the flow of the liquid mass has been cut off; and the third step of which consists in introducing a gas for drying purposes, at a temperature of 300° Fahrenheit or over, under superatmospheric pressure into the mold to dehydrate and dry the molded materials.

9. The process of forming products from comminuted materials, which employs a partial vacuum on the opposite or discharge side of the foraminous mold wall while the first step consists in forcing a liquid mass under super-atmospheric pressure against all parts of the foraminous mold wall at one time to simultaneously deliver and compactly deposit the comminuted materials in said mass to form the article; the second step of which consists in introducing a gas under super-atmospheric pressure to deposit the comminuted materials remaining suspended in the conduit and mold after the flow of the liquid mass has been cut off; and the third step of which consists in introducing a gas for drying purposes at a temperature of 300° Fahrenheit or over.

10. The process of dehydrating and drying moisture bearing materials, where, in order to assure speed, the materials are subjected to gas under such high pressure and temperatures as would otherwise injure the materials, which consists in opposing a high vacuum on the opposite side of the foraminous mold wall from that on which the high temperature and pressure are applied to prevent carbonization, oxidation, case-hardening or other injury to the materials so dried.

11. The process of forming products from comminuted materials, the first step of which consists in forcing a fluid mass against all parts of the foraminous mold wall at one time to simultaneously deliver and compactly deposit the comminuted materials in said mass to form the product and the second step of which consists in introducing an inert gas, such as nitrogen, neon or carbondioxide under superatmospheric pressure, to deposit the comminuted materials remaining suspended in the conduit and mold after flow of fluid mass has been cut off.

12. The process of forming products from comminuted materials, which employs a partial vacuum on the opposite or discharge side of the foraminous mold wall, while the first step consists in forcing a fluid mass against all parts of the foraminous mold wall at one time to simultaneously deliver and compactly deposit the comminuted materials in said mass to form the product and the second step of which consists in introducing an inert gas, such as nitrogen, neon or carbondioxide under superatmospheric pressure, to deposit the comminuted materials remaining suspended in the conduit and mold after flow of fluid mass has been cut off.

13. The process of forming products from comminuted materials, the first step of which consists in forcing a liquid mass under superatmospheric pressure against all parts of the foraminous mold wall at one time to simultaneously deliver and deposit the comminuted materials in said mass to form the product; the second step of which consists in introducing an inert gas, such as nitrogen, neon or carbondioxide under superatmospheric pressure to deposit the comminuted materials remaining suspended in the conduit and mold after the flow of the liquid mass has been cut off; and the third step of which consists in introducing a heated inert gas, such as nitrogen, neon or carbondioxide under superatmospheric pressure into the mold to dehydrate and dry the molded materials.

14. The process of forming products from comminuted materials, which employs a vacuum on the opposite or discharge side of the foraminous mold wall while the first step consists in forcing a liquid mass under superatmospheric pressure against all parts of the foraminous mold wall at one time to simultaneously deliver and deposit the comminuted materials in said mass to form the product; the second step of which consists in introducing an inert gas, such as nitrogen, neon or carbondioxide, under superatmospheric pressure to deposit the comminuted materials remaining suspended in the conduit and mold after the flow of the liquid mass has been cut off; and the third step of which consists in introducing a heated inert gas, such as nitrogen, neon or carbondioxide, under superatmospheric pressure into the mold to dehydrate and dry the molded materials.

15. The process of forming products from comminuted materials, the first step of which consists in forcing a liquid mass under superatmospheric pressure against all parts of the foraminous mold wall at one time to simultaneously deliver and deposit the comminuted materials in said mass to form the product; the second step of which consists in introducing an inert gas, such as nitrogen, neon or carbondioxide, under superatmospheric pressure to deposit the comminuted materials remaining suspended in the conduit and mold after the flow of the liquid mass has been cut off; and the third step of which consists in introducing a heated inert gas, such as nitrogen, neon or carbondioxide, at temperatures of 300° Fahrenheit or over under superatmospheric pressure into the mold to dehydrate and dry the molded materials.

16. The process of forming products from comminuted materials, which employs a partial vacuum on the outlet or discharge side of the foraminous mold wall while the first step consists in forcing a liquid mass under superatmospheric pressure against all parts of the foraminous mold wall at one time to simultaneously deliver and deposit the comminuted materials in said mass to form the product; the second step of which consists in introducing an inert gas, such as nitrogen, neon or carbondioxide, under superatmospheric pressure to deposit the comminuted materials remaining suspended in the conduit and mold after the flow of the liquid mass has been cut off; and the third step of which consists in introducing a heated inert gas, such as nitrogen, neon or carbondioxide, at temperatures of 300° Fahrenheit or over under superatmospheric pressure into the mold to dehydrate and dry the molded materials.

17. The process of dehydrating and drying moisture bearing materials, where, in order to assure speed in process, air is excluded and an inert gas, such as nitrogen, neon or carbondioxide under pressure and at higher temperatures that could be used with air or oxygen without injuring the materials is forced through the materials.

18. The process of dehydrating and drying moisture bearing materials, where, in order to assure speed in process, air is excluded and an inert gas, such as nitrogen, neon or carbon-dioxide under pressure and at temperatures of 300° F. or over is caused to flow through the materials.

19. The process of making products from comminuted materials, which, after forming, dehydrating and filling or sizing, consists in treating with a liquid proofing applied in solvents and thereafter subjecting to a treatment of heat, pressure and vacuum to extract and recover the solvents.

20. The process of dehydrating and drying a deposition held on a foraminous wall which comprises passing a heated drying gas through said deposition and increasing the rate of heat flow to the moisture in the deposition by the use of pressure on one side and partial vacuum on the other side of said wall.

21. The process of dehydrating and drying moisture bearing materials held on a foraminous wall comprising passing a heated drying gas through said deposition at a temperature of 300° F. or over while maintaining a partial vacuum on the other side of the wall.

22. The process of making articles of pulp comprising forcing pulp bearing liquids containing not more than 1% of solids against a foraminous wall under pressure of at least ninety pounds gauge.

23. The process of dehydrating and drying a deposition of material, held on a foraminous wall, which comprises forcing a gas through said deposition under pressure at least 90 pounds gauge and temperature of over 350° F., causing water and vapors to be driven out and expelled from the pores and particles of the deposition by the mechanical action of the escaping gas and to cause a high rate of heat transference and vaporization of the moisture caught in the pores and particles of the deposition by reason of the temperature of the gas and the pressure used to force it through the deposited materials, the deposition being held in the position in which it was deposited until substantially dry.

24. The process of dehydrating and drying a deposition of material which employs a partial vacuum on the opposite or discharge side of a foraminous mold wall, which comprises forcing a gas through said deposition under pressure at least 90 pounds gauge and temperature of over 500° F., causing water and vapors to be driven out and expelled from the pores and particles of the deposition by the mechanical action of the escaping gas and to cause a high rate of heat transference and vaporization of the moisture caught in the pores and particles of the deposition by reason of the temperature of the gas and the pressure used to force it through the deposited materials, the deposition being held in the position in which it was deposited until substantially dry.

25. The process of dehydrating and drying a deposition of material, held on a foraminous wall, which comprises forcing an inert gas, such as nitrogen, neon and carbon-dioxide, through said deposition under heavy pressure and intense heat, causing water and vapors to be driven out and expelled from the pores and particles of the deposition by the mechanical action of the escaping gas and to cause a high rate of heat transference and vaporization of the moisture caught in the pores and particles of the deposition by reason of the intense temperature of the gas and the high pressure used to force it through the deposited materials.

26. The process of dehydrating and drying a deposition of material which employs a partial vacuum on the opposite or discharge side of a foraminous mold wall, which comprises forcing an inert gas, such as nitrogen, neon and carbon-dioxide, through said deposition under heavy pressure and intense heat, causing water and vapors to be driven out and expelled from the pores and particles of the deposition by the mechanical action of the escaping gas and to cause a high rate of heat transference and vaporization of the moisture caught in the pores and particles of the deposition by reason of the intense temperature of the gas and the high pressure used to force it through the deposited materials.

27. Process of making articles of comminuted material, the first step of which consists in forcing a fluid mass against a foraminous mold wall to deposit thereon the comminuted material in said mass to form the wall of the article, the second step of which consists in subjecting the deposition to simultaneous vacuum and gaseous pressure on opposite faces for dehydrating purposes, and the third step of which consists in impregnating the deposition with filler and treating elements, while the exterior surface of the deposition is subjected to partial vacuum.

28. The method of making containers comprising building up the wall of the container by depositing successive layers of materials having different characteristics and interlocking said layers by felting.

29. In combination, means to maintain a partial vacuum on the outside or discharge side of a foraminous mold wall, means to force liquid pulp under automatically maintained constant continuous superatmospheric pressure against the inner side of the mold wall, means to cut off supply of pulp, means to admit gas under superatmospheric pressure, and means to cut off gas.

30. In combination, means to maintain a partial vacuum on the outside or discharge side of a foraminous mold wall, means to force liquid pulp under automatically maintained constant continuous superatmospheric pressure against the inner side of the mold wall, means to cut off supply of pulp, means to admit unheated gas under superatmospheric pressure, means to cut off unheated gas and means to admit heated gas under superatmospheric pressure, and means to cut off heated gas.

31. In combination, means to maintain a partial vacuum on the outside or discharge side of a foraminous mold wall, means to force liquid pulp under automatically maintained constant continuous superatmospheric pressure against the inner side of the mold wall, means to cut off supply of pulp, means to admit gas under superatmospheric pressure, means to cut off gas, and means to deliver a filling substance into the mold.

32. In combination, means to maintain a partial vacuum on the outside or discharge side of a foraminous mold wall, means to force liquid pulp under automatically maintained constant continuous superatmospheric pressure against the inner side of the mold wall, means to cut off supply of pulp, means to admit unheated gas under superatmospheric pressure, means to cut off unheated gas and means to admit heated gas under superatmospheric pressure, means to cut off heated gas, and means to admit a cooling gas under pressure.

33. In combination, means to maintain a partial vacuum on the outside or discharge side of a foraminous mold wall, means to force liquid pulp under automatically maintained constant continuous superatmospheric pressure against the inner side of the mold wall, means to cut off supply of pulp, means to admit unheated gas under superatmospheric pressure, means to cut off unheated gas and means to admit heated gas under superatmospheric pressure, means to cut off heated gas, and means to deliver a filling substance into the mold.

34. In combination, means to maintain a partial vacuum on the outside or discharge side of a foraminous mold wall, means to force liquid pulp under automatically maintained constant continuous superatmospheric pressure against the inner side of the mold wall, means to cut off supply of pulp, means to admit unheated gas under superatmospheric pressure, means to cut off unheated gas and means to admit heated gas under superatmospheric pressure, means to cut off heated gas, means to deliver a filling substance into the mold, and means to admit a cooling gas under pressure.

35. The combination of means to deposit moist pulp on a foraminous mold wall, means for passing heated gas for drying through said deposited pulp, and means for treating said pulp with a non-oxidizing cooling gas.

36. The process of dehydrating a deposition of material held on a foraminous wall which comprises forcing a gas through said deposition under pressure of at least 90 pounds gauge and a temperature of at least 1000° F. causing water and vapors to be driven out and expelled from the pores and particles of the deposition by the mechanical action of the escaping gas and to cause a high rate of heat transference and vaporization of the moisture caught in the pores and particles of the deposition by reason of the temperature of the gas and the pressure used by forcing it through the deposited materials, the deposition being held in the position in which it was deposited until substantially dry.

37. The process of dehydrating and drying a deposition of material held on a foraminous wall which comprises forcing a gas through said deposition under a pressure of at least 125 pounds gauge and a temperature of over 500° F., causing water and vapors to be driven out and expelled from pores and particles of the deposition by mechanical action of the escaping gas and to cause a high rate of heat transference and vaporization of moisture caught in the pores and particles of the deposition by reason of the temperature of the gas and pressure used to force it through the deposited material, the deposition being held in the position in which it was deposited until substantially dry.

38. The process of dehydrating and drying a deposition of material held on a foraminous wall which comprises forcing a gas through said deposition under pressure of at least 125 pounds guage and a temperature of at least 1000° F., causing water and vapors to be driven out and expelled from the pores and particles of the deposition by the mechanical action of the escaping gas and to cause a high rate of heat transference and vaporization of the moisture caught in the pores and particles of the deposition by reason of the temperature of the gas and pressure used to force it through the deposited materials, the deposition being held in the position in which it was deposited until substantially dry.

39. The process of dehydrating and drying a deposition of material held on a foraminous wall which comprises forcing a gas through said deposition under a pressure of at least 200 pounds gauge and a temperature of at least 500° F. causing water and vapors to be driven out and expelled from the pores and particles of the deposition by the mechanical action of the escaping gas and to cause a high rate of heat transference and vaporization of the moisture caught in the pores and particles of the deposition by reason of the temperature of the gas and the pressure used to force it through the deposited materials, the deposition being held in the position in which it was deposited until substantially dry.

40. The process of dehydrating and drying a deposition of material held on a foraminous wall which comprises forcing a gas through said deposition under a pressure of at least 200 pounds gauge and a temperature of at least 1000° F., causing water and vapors to be driven out and expelled from the pores and particles of the deposition by the mechanical action of the escaping gas and to cause a high rate of heat transference and vaporization of the moisture caught in the pores and particles of the deposition by reason of the temperature of the gas and the pressure used to force it through the deposited materials, the deposition being held in the position in which it was deposited until substantially dry.

41. The method or process of making pulp articles comprising depositing comminuted material from liquid pulp on a foraminous mold wall, drying materials deposited from said pulp by passing heated gas therethrough, and then cooling said material by passing a relatively cool gas therethrough.

42. The process of making articles of comminuted material comprising depositing the comminuted material from liquid pulp upon a foraminous mold wall within a closed mold, drying the deposited material while on the depositing wall to a substantially dry condition wherein no further drying is required for commercial purposes after removing it from the mold, said drying step being parformed by a current of gas containing substantially no free oxygen and at a temperature above 350° F., and cooling the article by a current of substantially oxygen free gas before opening the mold to the air.

43. The combination of means to deposit moist material on a foraminous mold wall, means for passing heated gas for drying through said deposited pulp, means for treating said pulp with cooling gas, and means whereby said prior mentioned means are operated automatically and in the order named.

HILLHOUSE BUEL.